United States Patent [19]

Stahl

[11] 4,057,985
[45] Nov. 15, 1977

[54] LOCKING NUT ASSEMBLY

[75] Inventor: Michael A. Stahl, Miami Beach, Fla.

[73] Assignee: Far Out Products, Ltd., Hollywood, Fla.

[21] Appl. No.: 677,835

[22] Filed: Apr. 16, 1976

[51] Int. Cl.² .......................................... F16B 41/00
[52] U.S. Cl. ...................................... 70/231; 70/232; 70/233; 70/259
[58] Field of Search ............... 70/229, 231, 233, 259, 70/232; 85/35

[56] References Cited

U.S. PATENT DOCUMENTS

| | | | |
|---|---|---|---|
| 529,683 | 11/1894 | Herman | 85/35 X |
| 1,547,464 | 7/1925 | Styan | 85/35 |
| 1,627,273 | 5/1927 | Coffin et al. | 85/35 |
| 1,692,826 | 11/1928 | Ganz | 70/259 X |
| 1,751,629 | 3/1930 | Harrington | 70/259 |
| 1,870,427 | 8/1932 | Stallings et al. | 70/231 |
| 1,900,146 | 3/1933 | Winkler | 70/231 X |
| 2,345,949 | 4/1944 | Robbins | 70/259 X |
| 3,222,976 | 12/1965 | Holman | 85/35 X |
| 3,540,245 | 11/1970 | Pope | 70/231 |

FOREIGN PATENT DOCUMENTS 160,192   2/1953   Australia .................................. 85/35

*Primary Examiner*—Roy D. Frazier
*Assistant Examiner*—Rodney H. Bonck
*Attorney, Agent, or Firm*—Lowe, King, Price & Markva

[57] ABSTRACT

A locking nut assembly comprises an axle nut, a resilient ring member and a cover member. The axle nut has a threaded bore at one end and a locking bore at the other end thereof. The threaded bore has a structural configuration which threadingly engages a bicycle axle. The outer surface of the axle nut has flat surface areas and an annular groove. The resilient ring member is disposed within the annular groove. The cover member is slidingly disposed over the outer surface of the axle nut. The cover member has a tapered, smooth outer surface and an end portion with a bore opening juxtaposed the locking bore of the axle nut. The use of the assembly prevents the untightening of the axle nut which holds the bicycle wheel in place on the bicycle frame.

1 Claim, 4 Drawing Figures

LOCKING NUT ASSEMBLY

BACKGROUND OF THE INVENTION

This invention relates to locking nuts which are useful in securing a bicycle wheel to a bicycle frame. More particularly, the assembly may be locked onto the bicycle axle so that the unauthorized removal is prevented.

Many people own bicycles. There is a present problem of theft with respect to bicycle wheels. It has become necessary in some locales to actually remove the front wheel of a bicycle before it is chained to a bicycle rack to reduce the likelihood of theft. The axle nuts presently used on bicycle wheels to hold them onto the bicycle frames are simply loosened and the wheel is then taken.

PURPOSE OF THE INVENTION

The primary object of this invention is to provide a device for preventing the unauthorized removal of a wheel from a bicycle.

Another object of the invention is to provide a locking nut assembly which prevents the unauthorized removal of a bicycle wheel from a bicycle frame.

Another object of the invention is to provide a device which is readily adaptable to any bicycle axle so that the wheel may be held onto the bicycle frame while eliminating the possibility of unauthorized removal.

SUMMARY OF THE INVENTION

These objects and other advantages are accomplished by the invention as disclosed herein. The locking nut assembly comprises an axle nut, a resilient ring member and a cover member. The axle nut has a threaded bore at one end and a locking bore at the other end thereof. The threaded bore has a structural configuration to threadingly engage a bicycle axle.

The axle nut has an outer surface including flat surface areas and an annular groove. The resilient ring member is disposed within the annular groove. The cover member is slidingly disposed over the outer surface of the axle nut. The cover member has a tapered, smooth outer surface and an end portion with a bore opening juxtaposed the locking bore of the axle nut.

Another feature of the invention is the use of a separate bushing member that threadingly engages the threaded bore of the axle nut. The bushing member has a threaded bore which will threadingly engage a bicycle axle. A plurality of bushing members may be used with a standard outside diameter fitting the axle nut and having various sized inner threaded bores for use with various sized bicycle axles.

The axle nut includes flat areas so that it may be gripped and tightened onto the end of the bicycle axle. The cover member fits freely over the entire axle nut. A conventional locking mechanism is inserted through the bore opening in the end portion of the cover member and into the locking bore of the axle nut. The locking mechanism secures the cover member in place so that it may not be removed once disposed around the outer surface of the axle nut. Spring loaded pins contained in the well known prior locking mechanism engage corresponding grooves formed in the inner surface of the locking bore of the axle nut.

The cover member has a smooth cylindrical inner surface so that it freely rotates when in the locked position over the outer surface of the axle nut. Its outer surface has a configuration that is effective to prevent a gripping thereof. Thus, when the axle nut is tightened against the bicycle frame member to hold the bicycle wheel in place, the freely rotatable cover member simply turns without any movement being effected in the axle nut that is threadingly engaged with the bicycle axle. The configuration of the outer surface of the cover member would necessitate an actual crushing of this cover member before the assembly could be gripped with a gripping tool such as a pair of pliers.

Because the cover member fits loosely over the outer surface of the axle nut, there is a problem of rattling. Therefore, it has been found that the use of a resilient ring member disposed in a groove in the axle nut will prevent the rattling. At the same time, the ring member does not prevent the free rotation of the cover member about the axle nut itself.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

DESCRIPTION OF SPECIFIC EMBODIMENTS

Figure 1:
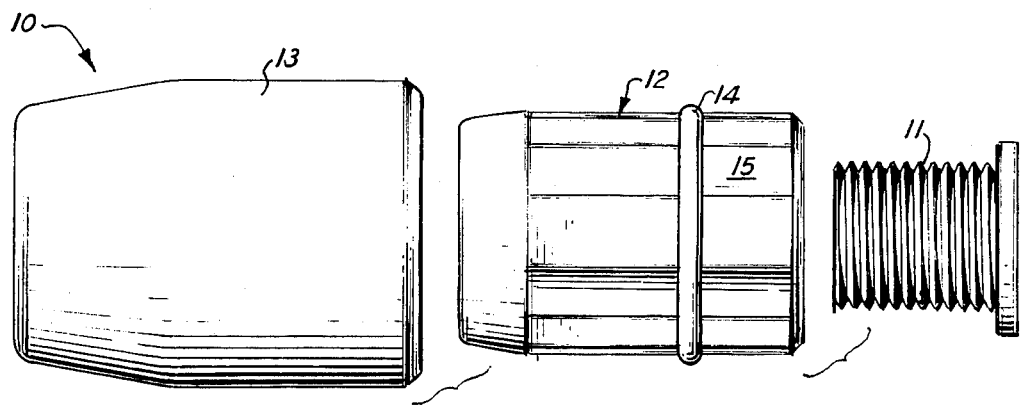
FIG. 1 is an exploded view showing a locking nut assembly made in accordance with this invention.
Figures 2, 3:
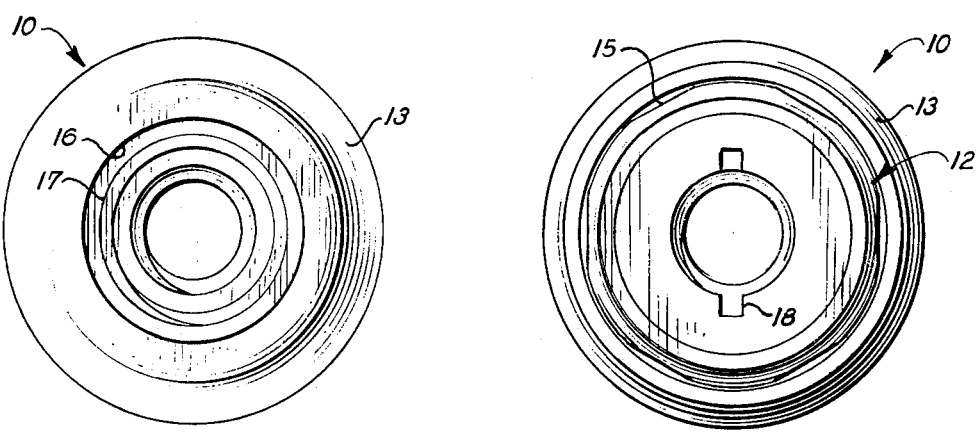
FIG. 2 is an end elevational view of the assembly of FIG. 1 as viewed from the lock mechanism end.
FIG. 3 is an end elevational view of the assembly of FIG. 1 as viewed from the bushing end thereof.
Figure 4:
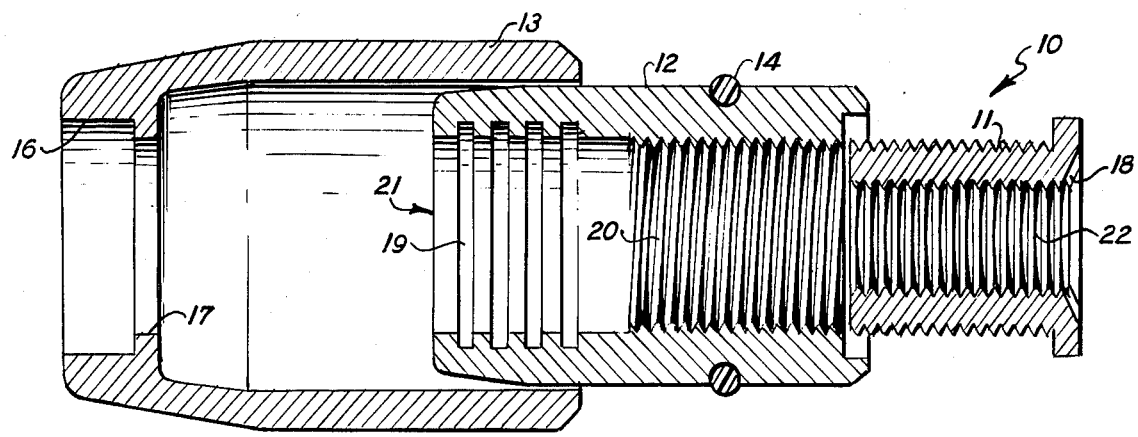
FIG. 4 is an exploded sectional view of the locking nut assembly made in accordance with this invention.

More specifically, referring to the drawings, the locking nut assembly, generally designated 10, includes a bushing member 11, an axle nut 12 and a cover member 13. The axle nut 12 includes a threaded bore 20 at one end thereof and a locking bore 21 at the other end thereof. The locking bore 21 includes a series of annular grooves 19 formed along the bore surface to mate with pins of a conventional locking mechanism (not shown) which is inserted into the locking bore 21. The conventional locking mechanism abuts the outside of the flange 17 of the cover member 13. The bore opening 16 in cover member 13 defines a passage into the locking bore 21 As is known in the prior art, the conventional locking mechanism has a series of pins which are retracted by the teeth of a key which is inserted therein. Once such a locking mechanism is inserted into the locking bore 21, the key thereof is removed and the pins of a locking mechanism project into grooves 19. This maintains the locking mechanism in place giving it free rotation around the entire axle nut 12 while maintaining the cover member 13 in place over the outside surface of the axle nut 12.

The outside surface of axle nut 12 also includes an annular groove into which a resilient ring member 14 is disposed. This ring prevents the rattling of the cover member 13 against the outer surface of the axle nut 12. At the same time, the cover member 13 is still freely rotatable around the entire surface of the axle nut 12.

The threaded bore 20 of axle nut 12 receives the threaded bushing member 11. The threaded bushing member 11 includes a threaded bore 22 which is of a size to threadingly engage the bicycle axle on which the assembly is applied. The groove 18 on the outer end of bushing 11 aids in effecting a firm threaded engagement with the threaded bore portion 20 of axle nut 12. The assembly is easily adaptable to various sized axles simply by providing additional bushing members having various sized threaded bores for fitting onto different bicycle axles.

It is possible that the axle nut 12 could have a threaded bore which would be threadingly engaged directly to the bicycle axle to which it is applied. This would eliminate the necessity for the bushing member 11. However, the additional feature of this invention using the bushing member makes the locking nut assembly of this invention extremely adaptable to numerous situations.

While a locking nut assembly has been shown and described in detail, it is obvious that this invention is not to be considered as being limited to the exact form disclosed, and that changes in detail and construction may be made therein within the scope of the invention, without departing from the spirit thereof.

Having thus set forth and disclosed the nature of this invention, what is claimed is:

1. A locking nut assembly comprising:
   a. an axle nut having a threaded bore at one end and a locking bore at the other end thereof;
   b. a separate bushing member having a threaded inner bore to threadingly engage a bicycle axle and a threaded outer surface to threadingly engage the threaded bore of said axle nut;
   c. said axle nut having an outer surface including flat surface areas and an annular groove;
   d. a resilient ring member disposed within said annular groove; and
   e. a cover member slidingly disposed over said outer surface of the axle nut and having an inner surface engaging the outer periphery of said ring member to prevent rattling of said cover member 13,
   f. said cover member having a tapered, smooth outer surface and an end portion with a bore opening juxtaposed the locking bore of the axle nut;
   g. said cover member being freely rotatable when locked in position over said outer surface of the axle nut to prevent rotation of the assembly for removal thereof when said axle nut is tightened on the bicycle axle against a frame member of the bicycle.

* * * * *